United States Patent [19]
Schmitt

[11] 3,850,316
[45] Nov. 26, 1974

[54] APPARATUS FOR LOADING AND UNLOADING VERTICALLY STACKED RACKS

[75] Inventor: Robert A. Schmitt, Vancouver, Wash.

[73] Assignee: Columbia Machine, Inc., Vancouver, Wash.

[22] Filed: Jan. 28, 1974

[21] Appl. No.: 437,399

[52] U.S. Cl............................................ 214/16.4 C
[51] Int. Cl............................................. B65g 1/06
[58] Field of Search..... 214/16.4 A, 16.4 B, 16.4 C, 214/16.1 DB, 16.4 R

[56] References Cited
UNITED STATES PATENTS

| | | | |
|---|---|---|---|
| 3,240,365 | 3/1966 | King.............................. | 214/16.4 A |
| 3,719,288 | 3/1973 | Schmitt et al.................. | 214/16.4 C |
| 3,738,506 | 6/1973 | Cornford et al. .............. | 214/16.4 C |

*Primary Examiner*—Robert J. Spar
*Assistant Examiner*—R. B. Johnson
*Attorney, Agent, or Firm*—Kolisch, Hartwell, Dickinson & Stuart

[57] ABSTRACT

Apparatus for loading articles onto the infeed end of a selected rack in a set of vertically stacked racks. The apparatus includes an infeed conveyor for moving articles horizontally and in succession into a region below the infeed ends of the racks and for positioning them a row in end-to-end relationship. An elevator having elongate, substantially horizontal lifting arms for receiving and holding opposed edge margins of the articles in a row is operable to raise them from the elevation of the conveyor to the elevation of a desired rack. The lifting arms have upper and lower guides forming a channel extending longitudinally of the arms which confines the upper and lower marginal edges of the articles. The lifting arms on the elevator are mounted for horizontal shifting toward and away from the infeed ends of the racks, so that when they arrive at the elevation of a desired rack they may be shifted into engagement with the racks whereby the channels in the arms join with channels in the racks to form continuous guide paths for articles to be transferred onto the racks. A pusher, which is vertically adjustable to different positions adjacent the infeed ends of the different racks is operable to push articles off the elevator and onto a selected rack.

16 Claims, 11 Drawing Figures

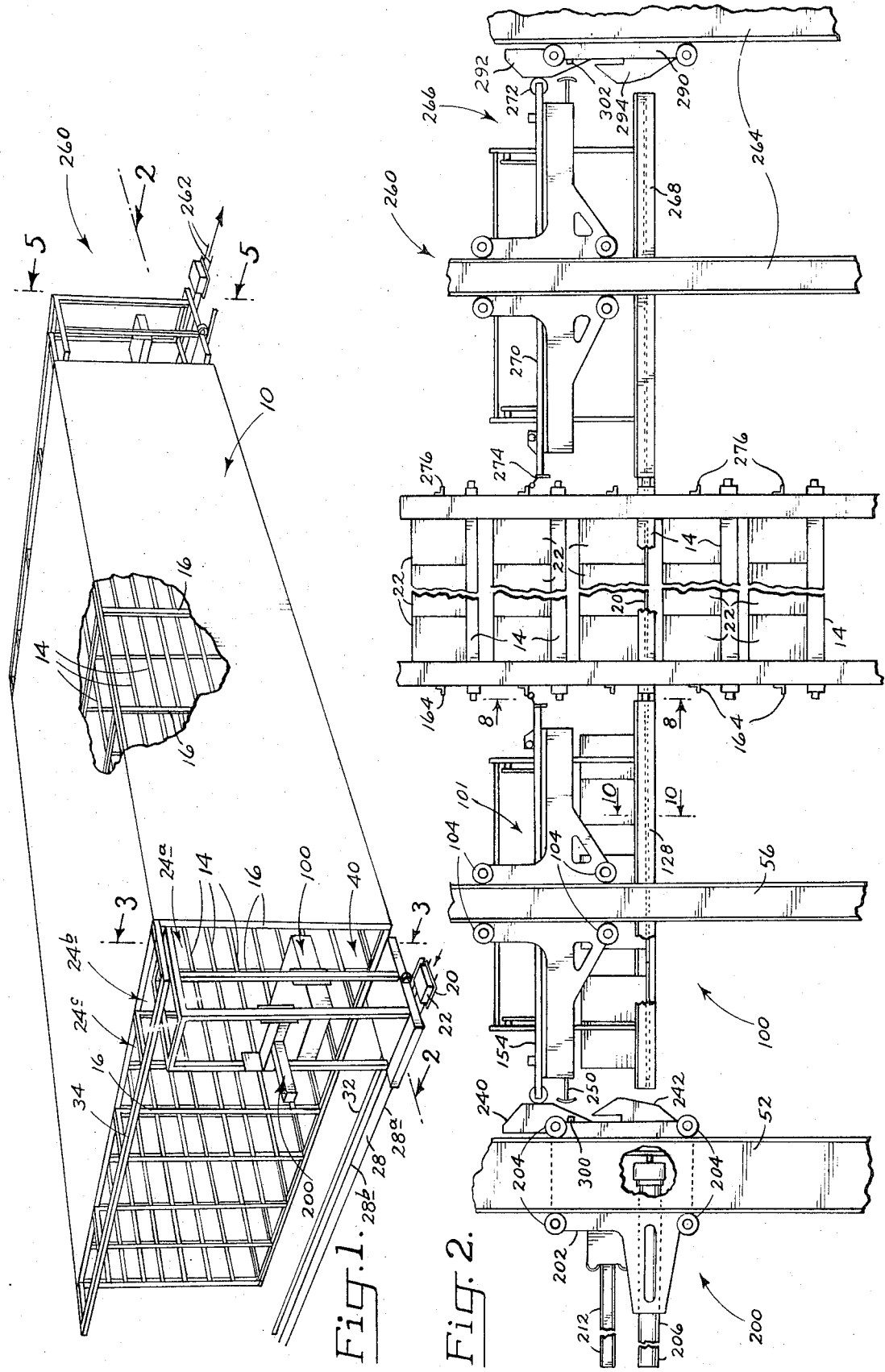

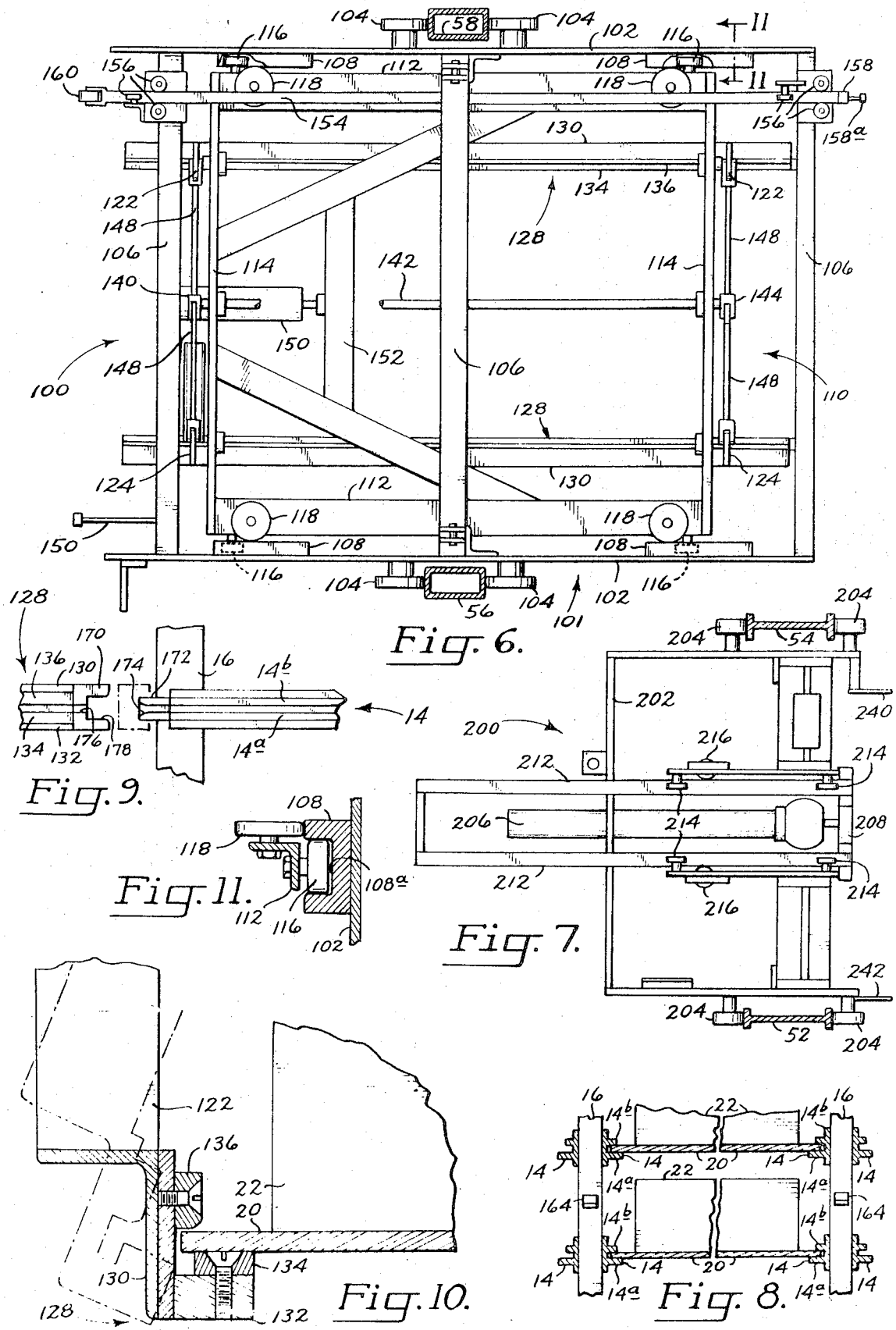

APPARATUS FOR LOADING AND UNLOADING VERTICALLY STACKED RACKS

BACKGROUND AND SUMMARY OF THE INVENTION

This invention relates to apparatus for loading and unloading articles from vertically stacked racks.

In the manufacture and/or warehousing of certain articles, it is often necessary to support the articles on vertically stacked, horizontal racks. An example of this is found in the manufacture of concrete blocks. Such blocks after being formed in a block-making machine may be placed, in an uncured state, on sheet metal pallets. The block-laden pallets then are conveyed, one after another, to sets of elongate, vertically stacked racks within a kiln onto which they may be loaded for curing. When moving such pallet-supported blocks, they should travel in a manner whereby they remain substantially horizontal. If they are moved in a substantially inclined position there is a possibility that the blocks may shift on the pallet with resultant damage to the blocks.

Various devices for loading blocks into a kiln have been developed in the past, however, such prior devices generally have either been fairly slow or rough in operation, to the extent that damage has occurred to the articles being moved.

A general object of the invention is to provide novel apparatus for quickly and efficiently loading a plurality of articles onto vertically stacked racks and unloading them therefrom.

Another object of the invention is to provide novel apparatus for loading articles onto vertically stacked racks, which apparatus is operable to maintain the articles in substantially horizontal position as they are operated upon.

More specifically, an object is to provide such novel apparatus which includes an infeed conveyor for moving articles along a substantially horizontal path into a position spaced below the infeed set of ends of the racks, an elevator operable to receive a plurality of such articles disposed in end-to-end relationship in a row which extends substantially parallel to the racks and to lift the articles and raise them along a substantially vertical path to a position adjacent the infeed end of a selected rack, and a pusher for moving the row of articles horizontally from the elevator onto the selected rack.

Another object is to provide such novel apparatus wherein lifting arms on the elevator and the racks in the stacks have upper and lower guides thereon defining channels for slidably receiving and confining opposed marginal edge portions of articles to be loaded onto the racks. Such upper and lower guides on the lifting arms and racks prevent contiguous ends of adjacent articles from riding up and onto each other when a pushing force is applied to the row of articles to shift them onto selected racks.

Yet another object is to provide such novel apparatus in which the lifting arms are shiftable into engagement with the infeed end of a selected rack, whereby channels in the lifting arms join with channels in the racks to define a continuous guide path for articles. With such construction, the articles may be pushed onto the racks without fear of misalignment occurring therebetween.

A still further object is to provide such novel apparatus which includes operating means which allows the elevator to rise with the lifting arms spaced outwardly from the infeed set of ends of the racks so that the arms will clear the racks, yet which is actuatable to shift the lifting arms into engagement with the infeed ends of a selected rack when the arms reach the elevation of such rack.

BRIEF DESCRIPTION OF THE DRAWINGS

These and other objects and advantages of the invention will become more fully apparent as the following description is read in conjunction with the drawings, wherein:

FIG. 1 is a perspective view, with portions broken away, of an elongate kiln having article-receiving racks therein and apparatus according to the invention for loading the racks, as viewed from the infeed set of ends of the racks in a kiln;

FIG. 2 is an enlarged view taken generally along the line 2—2 in FIG. 1 with portions broken away;

FIG. 6 is an enlarged top plan view of an elevator in the infeed mechanism taken generally along the line 6—6 in FIG. 3;

FIG. 7 is an enlarged top plan view of a pusher in the infeed mechanism taken generally along the line 7—7 in FIG. 3;

FIG. 8 is an end elevation view of an article-holding rack in the kiln taken generally along the line 8—8 in FIG. 2;

FIG. 9 is an enlarged side elevation view of an end of a lifting arm on the elevator and an infeed end of a rack;

FIG. 10 is a view taken generally along the line 10—10 of FIG. 2 illustrating in cross-section the configuration of a lifting arm on the elevator; and FIG. 11 is an enlarged cross-sectional view taken generally along the line 11—11 in FIG. 6.

DETAILED DESCRIPTION OF THE INVENTION

Figure 3:
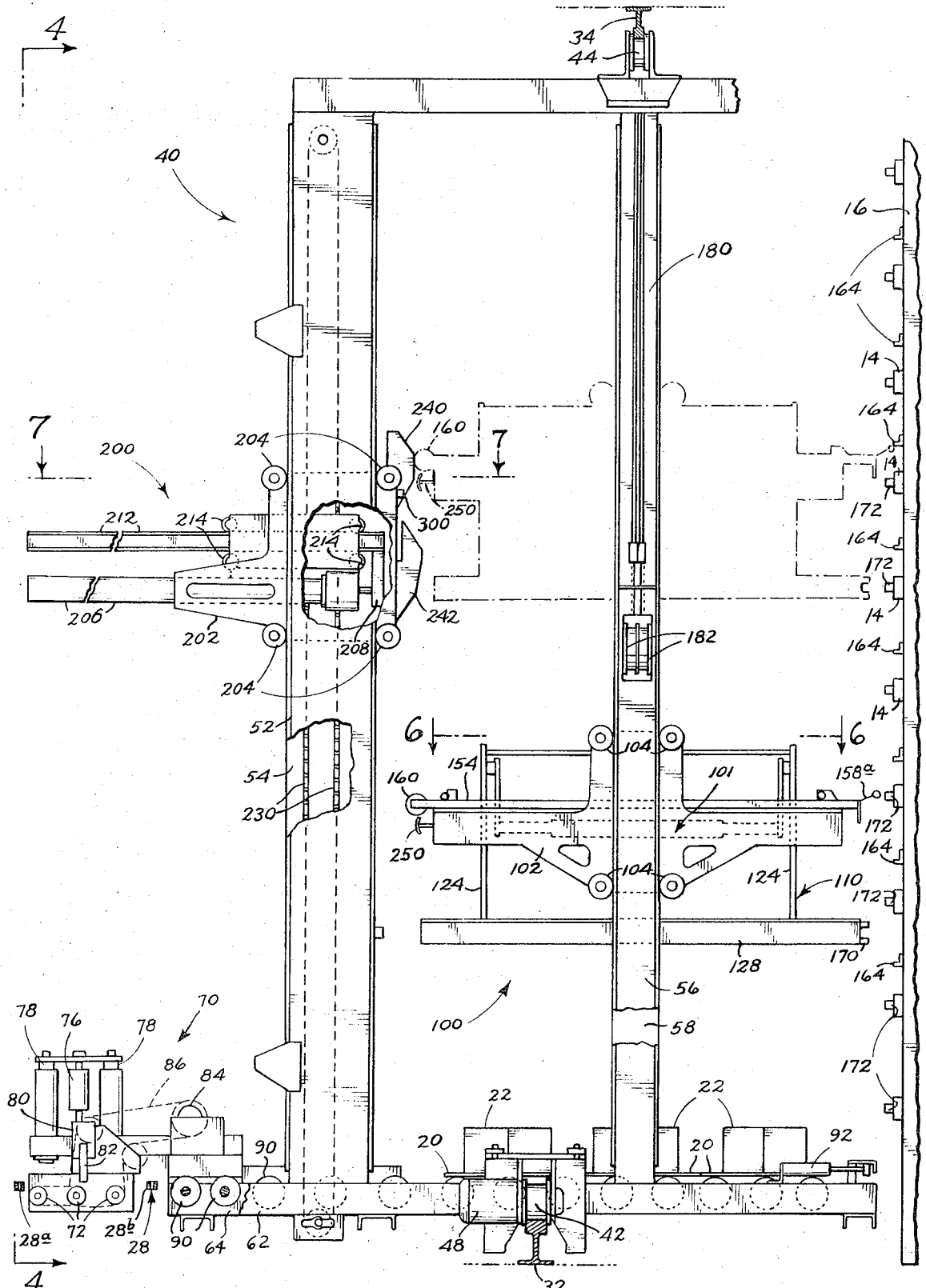
FIG. 3 is an enlarged side elevation view taken generally along the line 3—3 in FIG. 1, of mechanism for loading articles onto the infeed ends of racks in the kiln.

Referring now to the drawings and first more specifically to FIG. 1, at 10 is indicated generally a kiln into which concrete blocks supported on sheet metal pallets may be loaded for curing. The infeed end of the kiln is nearest the viewer in FIG. 1 and the outfeed, or discharge, end is farthest from the viewer.

A plurality of substantially horizontal, parallel, elongate channel members 14 extend the full length of the kiln. The channels are secured to and supported in vertically and horizontally spaced relationship on upright columns 16 in the kiln to define a plurality of vertically stacked tiers of racks adapted to receive pallets in the kiln (see FIGS. 1, 2 and 8).

As is best seen in FIG. 8, each of channels 14 has a horizontally projecting lower flange 14a and a horizontally projecting upper flange 14b spaced thereabove. Flanges 14a, 14b extend fully the length of the channel member, from the infeed to the outfeed ends of the kiln, and are spaced apart vertically a distance slightly greater than the thickness of a pallet, such as the pallet indicated generally at 20 in FIG. 8. Each pallet 20 is adapted to carry at least one concrete block 22, and possibly a plurality of such blocks through the apparatus. As is best seen in FIGS. 2 and 8, channels 14 secured to posts 16 are spaced apart vertically a distance slightly greater than the height of pallet 20 and the blocks 22 carried thereon. Opposed, facing channels 14 are aligned in a substantially common horizontal plane whereby they are positioned to receive opposed marginal edge portions of a pallet 20.

The vertical space between flanges 14a, 14b of each channel 14 is greater than the thickness of a pallet, but is less than twice the thickness of the pallet. The channel between flanges 14a, 14b thus is sufficient to slidably receive a pallet therebetween, but is narrow enough to prevent an edge of one pallet from riding up and onto an adjacent pallet on the rack when adjacent pallets are forced together.

The stacks of racks are disposed in multiple, side-by-side sets indicated generally at 24a, 24b, 24c in FIG. 1. The racks have infeed ends nearest the viewer in FIG. 1 and to the left of center in FIG. 2, and outfeed, or discharge, ends farthest from the viewer in FIG. 1 and to the right of center in FIG. 2. Each rack in a set is at substantially the same elevation as a rack in an adjacent set.

Figures 4, 5:
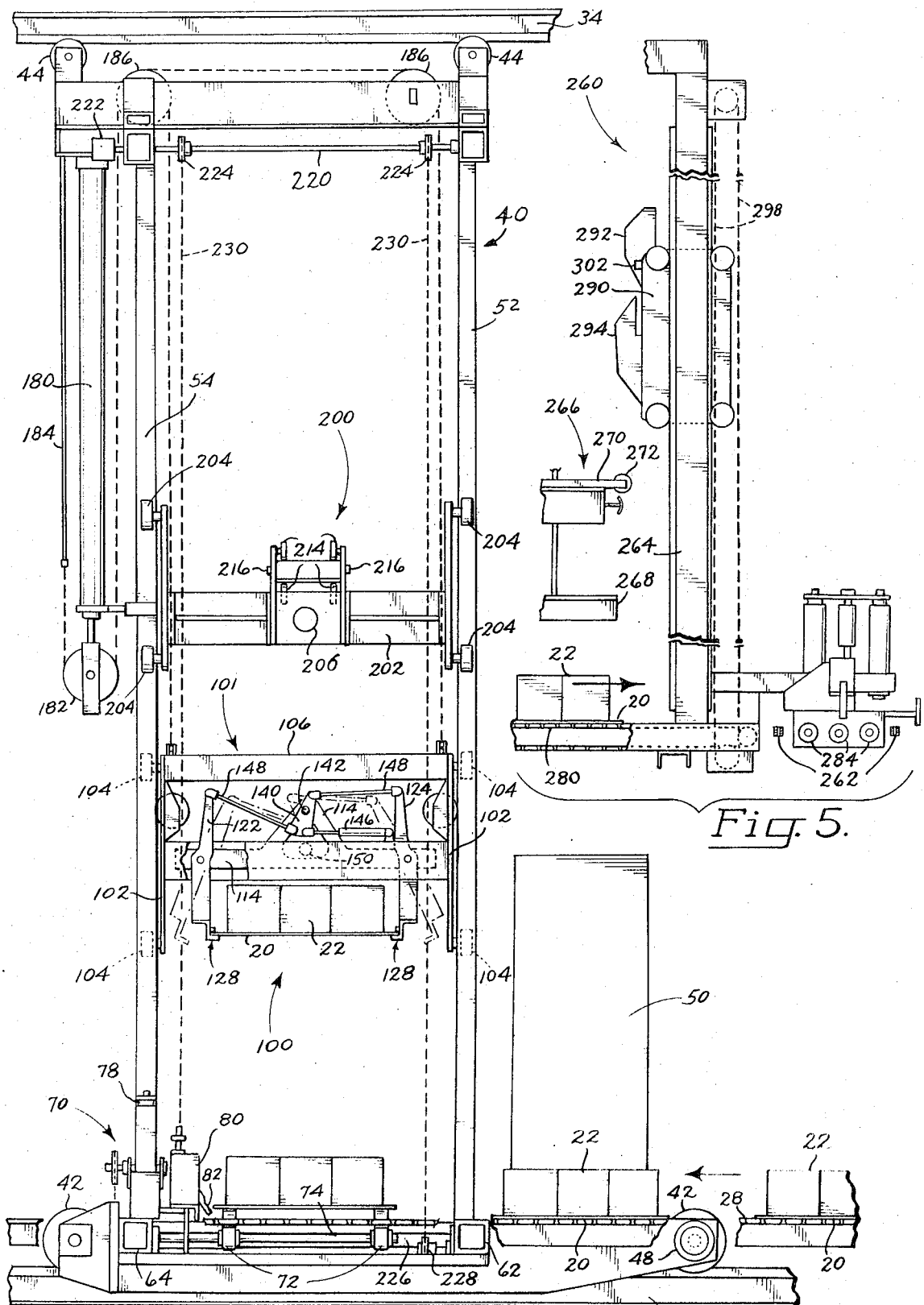
FIG. 4 is an end elevation view of the loading mechanism taken generally along the line 4—4 in FIG. 3.
FIG. 5 is an enlarged side elevation view, with portions broken away, taken generally along the line 5—5 in FIG. 1 of a portion of unloading mechanism at the discharge, or outfeed, ends of the racks in the kilns.

An infeed conveyor illustrated schematically at 28 in FIG. 1 extends substantially horizontally, transversely of and below the infeed ends of the racks. Referring to FIGS. 3 and 4, the infeed conveyor includes a pair of elongate, endless, laterally spaced, substantially parallel, power-driven conveyor chains 28a, 28b. The substantially horizontal upper reaches of these chains are driven for movement to the left in FIG. 1 and FIG. 4 whereby they may carry block-laden pallets 20 substantially horizontally and in succession to the left in FIGs. 1 and 4, transversely of the infeed ends of the racks.

Also extending transversely of the infeed set of ends of the racks in the kiln are a lower rail 32 extending substantially parallel to and adjacent conveyor chains 28a, 28b and an upper support rail 34 extending substantially horizontal transversely of the infeed ends of the racks adjacent the top of the kiln (see FIGS. 1, 3 and 4). A substantially upright frame 40 having wheels 42 journaled thereon adjacent its bottom, and wheels 44 journaled thereon adjacent its top is mounted for movement on tracks 32, 34 transversely of the infeed ends of the racks. The frame is shiftable transversely of the infeed ends of the racks whereby it may be positioned adjacent the infeed ends of a selected set of racks in the kiln.

As is best seen in FIGS. 3 and 4, a motor 48 is connected to one of wheels 42 for providing driving force for the frame along rails 32, 34 transversely of the infeed ends of the racks. Controls for the apparatus mounted on frame 40 are housed in an enclosure 50.

Frame 40 includes a pair of laterally spaced, substantially parallel, upright I-beams 52, 54 disposed intermediate conveyor 28 and rail 32, and a pair of substantially parallel, laterally spaced, upright box beams 56, 58 which are disposed between rail 32 and the infeed set of ends of the racks in the kiln. A pair of elongate, laterally spaced, substantially horizontal box beams 62, 64 are joined, as be welding, to the lower set of ends of beams 52, 54, 56, 58 and extend substantially parallel to the racks in the kiln.

Mounted on the outer end of horizontal box beam 64 is a jump roll mechanism indicated generally at 70 (see FIGS. 3 and 4). Jump roll mechanism 70 is cantilevered out from an end of beam 64 adjacent conveyor 28. The positioning of the jump roll mechanism is such as to permit chains 28a, 28b to run freely past opposite sides of the mechanism.

Mechanism 70 includes a plurality of rollers 72 secured on rotatable shafts 74 extending parallel to and positioned between chains 28a, 28b. Shafts 74 and rollers 72 thereon are shiftable from a normally at-rest position, as shown in FIGs. 3 and 4, below the level of the upper surfaces of chains 28a, 28b to a position spaced a short distance above such chains.

Shifting of rollers 72 and shafts 74 is accomplished by actuation of an extensible-contractible ram 76 connected thereto through a pair of guide posts 78. Ram 76 is actuated by a control valve 80. The control valve includes an operating arm 82 which is disposed in the path of block-laden pallets carried along chain conveyor 28. Explaining further, when a block-laden pallet, such as those indicated generally at 20 traveling to the left in FIG. 4, comes into contact with arm 82 it actuates valve 80 to produce extension of ram 76 raising shafts 74 and rollers 72 to positions above the chain conveyor. In this manner, a block-laden pallet conveyed to the jump roll mechanism is lifted from the conveyor chains.

A motor 84 is connected to shafts 74 through a drive chain 86 (see FIG. 3) in such a manner that operation of the motor with a block-laden pallet supported on rollers 72 above chains 28a, 28b, produces movement of the pallet to the right in FIG. 3 and away from the viewer in FIG. 4. In this way, successive block-laden pallets may be removed from chain conveyor 28 and movement thereof is initiated in the direction of the kiln.

Box beams 62, 64 have a plurality of substantially parallel, laterally spaced, rollers 90 mounted thereon over which pallets from the jump roll mechanism may be moved. The initial rollers 90 adjacent the left end of beams 62, 64 in FIG. 3 are powered for rotation to drive pallets to the right in FIG. 3. Rollers 90 adjacent the right ends of beams 62, 64 in FIG. 3 are not driven, whereby the pallets must move thereacross under their own momentum.

As is seen in FIG. 3, as successive block-laden pallets 20 are conveyed onto rollers 90 by the jump roll mechanism they are aligned in end-to-end abutting relationship forming a row which extends substantially parallel to the racks in the kiln. When a preselected number of pallets have been conveyed onto rollers 90 adjacent the right end of beams 62, 64, a sensing mechanism is actuated to prevent further block-laden pallets from being fed to rollers 90 until such row of pallets has been removed from rollers 90.

Referring now to FIGS. 2, 3, 4 and 6 at 100 is indicated generally an elevator mounted for vertical movement on beams 56, 58 between a lowered position adjacent the infeed conveyor and various raised positions substantially in axial alignment with selected racks in the kiln.

The elevator includes a carriage frame 101 having opposed, laterally spaced, upright side plates 102. Journaled on side plates 102 are a plurality of rollers 104 which mount the elevator for vertical movement on beams 56, 58. Referring to FIG. 6, side plates 102 are maintained in spaced relationship by a plurality of elongate spacer bars 106 which extend therebetween and are secured adjacent their opposite set of ends to plates 102. Four elongate track members 108, each having a substantially C-shaped cross section as seen in FIG. 11, are secured to the inwardly facing sides of side plates 102. The inner channels 108a defined in members 108 are disposed substantially horizontal and extend parallel to side plates 102.

A subframe indicated generally at 110 is mounted on side plates 102 for shifting horizontally relative thereto toward and away from the infeed set of ends of the racks. Explaining further, and referring still to FIG. 6, subframe 110 includes a pair of elongate, laterally spaced, substantially horizontal angle members 112 which are secured to opposite ends of a pair of upright plate members 114, extending transversely of the subframe. Rollers, such as those indicated generally at 116, 118 journaled on members 112 provide rolling contact between the shiftable frame 110 and the carriage frame. Explaining further, and referring to FIG. 11, rollers 116 are received in and guided by channels 108a of track members 108 and rollers 118 engage and are guided by inwardly facing vertical surfaces of members 108.

A pair of substantially upright, elongate, laterally spaced arms 122, 124 (see FIGS. 3 and 4) are journaled intermediate their ends adjacent opposite ends of one of plate members 114 for swinging toward and away from each other. A similar pair of arms 122, 124 are journaled on the other of plate members 114 adjacent the opposite end of the elevator for swinging toward and away from each other also.

Secured to the lower ends of members 122, 124 are elongate, article-support members 128. As is best seen in FIGS. 3 and 6, one of members 128 extends between and is secured to the lower set of ends of members 122 on one side of the elevator and the other of members 128 extends between and is secured to the lower set of ends of members 124. Members 128 are mirror images of each other, and thus only one will be described in detail.

Referring to FIGS. 6 and 10, a support member 128 is composed of an elongate angle member 130 which is supported with one of its sides projecting downwardly. Secured to the lower end of the downwardly projecting side of angle 130 is an elongate support bar 132, atop which an elongate support pad 134 is secured. Secured to the downwardly projecting leg of angle 130 and spaced a distance above support pad 134 is an elongate guide bar 136. The lower outer edge of guide bar 136 is chamfered at approximately a 45° angle. Members 122, and 124 and 128 are referred to collectively herein as lifting arms. Pad 134 and bar 136 also are referred to herein as guides, or guide means. As is seen in FIG. 10, wherein an edge of a pallet 20 is supported on member 128, the vertical spacing between pad 134 and bar 136 is slightly greater than the thickness of the pallet, but is less than twice the thickness of a pallet. The importance of this spacing will be explained more fully below.

Support members 128 are swingable with their associated leg members 122, 124 between what may be considered closed positions as illustrated in solid outline in FIGS. 4 and 10 for supporting opposite edge margins of a row of pallets, and open positions spaced outwardly therefrom as illustrated in dot-dashed outline in FIGs. 4 and 10. Mechanism for swinging the arms and support members between their open and closed positions is best shown in FIGS. 4 and 6. Such mechanism includes a crank arm 140 secured to one end of an elongate crank rod 142. Rod 142 is journaled adjacent its opposite ends in plates 114 and has a crank arm 144, similar to arm 140, secured adajcent its opposite end. An elongate extensible-contractible ram 146 is operatively connected to one end of arm 140. A pair of operating rods 148 operatively connect opposite ends of crank arm 140 to the upper ends of arms 122, 124 in such a manner that contraction of ram 146 produces swinging of support members 128 to their widely spaced, open positions and extension of the ram swings them to their closed position shown in solid outline in FIG. 4.

With the support members swung to their open positions and the elevator in a lowered position, with the support members on opposite sides of rollers 90, block-laden pallets may be formed into a row therebetween. After a preselected number of block-laden pallets have entered the space between the arms, the arms may be swung to their closed position to grip opposite edge margin portions of the pallets as illustrated in FIGS. 4 and 10.

An extensible-contractible ram 150 is connected between one of cross members 106 on the carriage frame of the elevator and a cross member 152 of the horizontally shiftable subframe 110 in such a manner that extension and retraction of the ram results in shifting of the subframe carrying the lifting arms toward and away from the infeed ends of the racks in the kiln.

An elongate horizontal bar 154 is mounted by rollers 156 atop the elevator carriage frame for substantially horizontal shifting to the right and left in FIGS. 3 and 6. Bar 154 is shiftable horizontally relative to the elevator frame between a retracted position as illustrated in solid outline in FIG. 3 spaced outwardly from the infeed ends of the racks and an extended, position, illustrated in dot-dash outline in FIG. 3 and in solid outline in FIG. 2, closer to the racks. Spring means (not shown) is connected to bar 154 for yieldably biasing it to its retracted position.

Secured adjacent the right end of bar 154 (the end of the bar nearest the infeed ends of the racks) is a limit switch 158 having an actuating arm 158a. At the opposite end of bar 154 is journaled a roller 160 which acts as a cam follower, as will be explained in greater detail below. Switch 158 is operatively connected to ram 150 on the elevator in such a manner that movement of arm 158a in one direction results in extension of ram 150 to shift support arms 128 toward the infeed ends of the racks. Switch 158 also is operatively connected to the means for raising the elevator to stop the elevator at a selected position as it is being raised, as will be explained below.

Referring to FIGS. 3 and 8, secured to support posts 16 are a plurality of short angle members 164. Each of these angle members is so positioned on the support post that it is in a position to be in the path of arm 158a of switch 158 when it is raised in its extended position, shifted toward the intake ends of the racks. Each of angles 164 is associated with one of the racks in the stacks, whereby when actuating arm 158a engages an angle 164 the lifting arms of the elevator are in substantially axial alignment with an infeed set of ends of the channels forming a rack.

Referring to FIG. 9, the end of a lifting arm 128 and the infeed end of a rack are illustrated in greater detail. A pair of mating, aligning elements 170, 172 are secured to adjacent ends of the lifting arms and racks, respectively. Referring first to element 170, it includes a block member secured to post 16 and to the end of rack 14. The block member has a channel 174 formed therein which joins to and forms an extension, or continuation, of the channel between flanges 14a, 14b. The outer end portion of channel 174 flares outwardly to facilitate the entry of pallets therein.

Element 170, secured to the end of lifting arm 128, has a channel 176 therein which forms an extension of the channel between parts 134, 136 on the lifting arm. Element 170 also has a notch 178 formed therein adapted to fit in mating relationship over element 172 as illustrated in dashed outline in FIG. 9. With the lifting arms on the elevator aligned with the channels of a rack and shifted horizontally into contiguous relationship therewith, element 170 fits over element 172 and the channels therein form a substantially continuous guide path along which pallets may be pushed from the lift arms onto the racks.

Referring to FIGS. 3 and 4, power for raising and lowering the elevator is provided by an elongate, upright ram 180 secured to one side of frame 40. The rod end of ram 180 is directed downwardly and a pair of side-by-side sheaves 182 are journaled thereon. A pair of elongate chains secured at one set of their ends to a securing rod 184 are trained in reverse bends about sheaves 182, extend upwardly and over the tops of a pair of sheaves 186 journaled adjacent the top of frame 40, and downwardly to connect at their opposite sets of ends to opposite sides of elevator frame 100. With such construction, extension of ram 180 raises the elevator and contraction permits lowering under the influence of gravity. Switch 158, previously described, is operatively connected to control means for ram 180 in such a manner as to stop the ram when switch 158 is actuated.

Referring to FIGS. 2, 3, 4 and 7, pusher mechanism, indicated generally at 200 is mounted for vertical movement on beams 52, 54. The pusher mechanism includes a carriage 202 on which are journaled a plurality of rollers 204. Rollers 204 engage opposite sides of beams 52, 54 to support carriage 202 for vertical movement therealong.

An elongate, substantially horizontal, extensible-contractible ram 206 is mounted on carriage 202 with its rod end directed toward the infeed set of ends of the racks. A pusher head 208, comprising a substantially upright plate, is secured to the outer end of the rod of ram 206 for shifting movement toward and away from the infeed ends of the racks upon extension and contraction of the ram. The upper end of pusher head 208 is secured to and supported by a pair of elongate, laterally spaced, substantially horizontal and parallel guide rails 212. A plurality of upper and lower guide rollers 214 and a pair of laterally spaced side guide rollers 216, all of which are journaled on carriage 202, provide rolling support for guide rails 212 as they are shifted horizontally toward and away from the racks with movement of pusher head 208.

Adjacent the top of frame 40 is an elongate shaft 220 which is journaled adjacent its opposite ends on the upper portion of frame 40 and is driven by a motor 222 connected thereto. A pair of laterally spaced sprockets 224 are mounted on shaft 220. Another shaft 226 journaled on a lower portion of frame 40 and having laterally spaced sprockets such as that indicated generally at 228 is positioned directly below and in line with shaft 220. A pair of elongate, laterally spaced, drive chains 230 are trained over sprockets 224, 228 with one set of ends of chains 230 connected to the top of carriage 202 of the pusher mechanism and the other set of ends of chains 230 connected to the bottom of carriage 202. With such mounting, actuation of motor 222 is operable to produce raising or lowering of the pusher mechanism to desired vertically spaced positions substantially in axial alignment with selected racks in the stack in the kiln.

Secured to the front of carriage 202, on the side of the carriage facing the kiln racks, are a pair of cam plates 240, 242. Cam plates 240, 242 have the general outlines and positions on carriage 202 as illustrated in FIGS. 3 and 7. Cam plate 240 is positioned to be engaged by cam follower 160 carried by bar 154 on the elevator as the elevator is raised. The configuration of cam plate 240 is such that as the elevator is raised to a position adjacent such cam plate follower 160 engages the lower sloping portion of the cam plate. Continued raising of the elevator causes bar 154 to shift toward the infeed ends of the kiln racks. As it shifts toward the kiln racks, the operating arm 158a of switch 158 is moved into a position wherein it may be actuated by an angle member 164. As has been stated previously, when switch arm 158a is brought into contact with an angle member 164, it stops operation of ram 180 to stop the elevator and produces operation of ram 150 to shift the lifting arms into engagement with the infeed end of the rack with which it is aligned.

Cam plate 242 is positioned on the pusher mechanism to be engaged by a trip arm 250 mounted on elevator 100 (see FIGS. 3 and 6). Trip arm 250 is operatively connected to a rotary valve through which fluid under pressure is supplied to ram 180 which raises and lowers the elevator. In operation the elevator is raised by operation of ram 180 at a relatively rapid speed to a position near a selected rack onto which articles are to be pushed, trip arm 250 engages cam 242 and is actuated to produce partial closing of the rotary valve which slows the operation of ram 180 and slows raising of the elevator. As the elevator is raised, bar 154 is shifted toward the racks by cam 240 whereby switch arm 158a may engage an actuating angle 164. When arm 158a engages angle 164, the elevator is stopped by an operative connection between swich 158 and valving mechanism for ram 180. In this manner, the elevator may be raised rather rapidly from a position adjacent the infeed conveyor to a position near the rack onto which it is to discharge block-laden pallets, and then is gradually slowed. When it reaches the exact position desired, it is then stopped by actuation of switch 158.

At the outfeed, or discharge, ends of the racks in the kiln, transfer means indicated generally at 260 is provided for receiving block-laden pallets discharged from the outfeed ends of the racks and lowering them onto a pair of power-driven conveyor chains indicated generally 262 in FIGS. 1 and 5.

Referring to FIGS. 1, 2 and 5, the transfer means is somewhat similar to the infeed means in that it includes a substantially similar upright frame 264 on which a vertically shiftable elevator 266 is mounted. Elevator 266 is similar to elevator 100, previously described, including lifting arms 268 which are shiftable toward the outfeed set of ends of selected racks to latch thereonto to form a substantially continuous guide path from the racks onto the lifting arms. Also included on elevator 266 is a horizontally shiftable switch bar 270 having a cam follower 272 on one of its ends and a switch 274 at its other end. Bar 270 is positioned for shifting horizontally as previously described for bar 154 on elevator 100. Actuating members 276 projecting outwardly from support posts adjacent the outfeed ends of the racks are operable to actuate switch 274 in a manner as has been described for members 164 at the infeed ends of the racks. Mechanism for raising and lowering elevator 260 and for shifting lifting arms 268 toward and away from the outfeed ends of the racks is provided for elevator 260 and has substantially the same construction as previously described for such mechanism for elevator 100.

Referring to FIG. 5, a power-driven chain conveyor 280 is mounted on the lower portion of frame 264 of the outfeed transfer mechanism in place of rollers 90 used on the infeed mechanism. Such chains 280 are operable to carry block-laden pallets lowered thereon toward a set of jump rollers 284. Jump rollers 284 are substantially similar to those previously described at 72 at the infeed end of the racks. The major difference in the jump roller mechanism at the outfeed ends of the racks is that such jump rollers normally are in a raised position for receiving block-laden pallets carried thereto by conveyor chains 280 and upon receiving a pallet are operable to lower it onto chains 262 for conveying the pallet away from the mechanism.

Another distinction between the transfer mechanism at the outfeed end of the kiln and the infeed mechanism is that there is no need for a ram-operated pusher at the outfeed ends of the racks. Thus, only a roller-mounted, vertically shiftable carriage 290 mounting a pair of cam plates 292, 294 comparable to cam plates 240, 242, respectively, is mounted on frame 264 rearwardly of elevator 266. Carriage 290 is shiftable vertically on frame 264 by a motor-driven chain 298 to position it substantially in axial alignment with the outfeed end of a rack with which pusher 200 is aligned.

Conventional control circuitry (not shown) is connected to the infeed and outfeed mechanism for producing a desired sequence of operation as will be described below, and to maintain the transfer mechanism at the outfeed set of ends of the racks aligned with the end of the rack with which the infeed mechanism is aligned.

Referring to FIGS. 2, 3 and 5, mounted on pusher carriage 202 is a light source 300 and on carriage 290 at the outfeed mechanism is a photocell 302. Light source 300 and photocell 302 are so positioned on their respective carriages that when these carriages are in proper position aligned with a selected rack, the light will shine over blocks on the rack to photocell 302. These are interconnected through appropriate control mechanism to assure that the infeed and outfeed mechanism are aligned with the same rack in the kiln prior to the apparatus being operable to load pallets onto the infeed ends of the racks.

OPERATION

Explaining now the operation of the apparatus the infeed mechanism first is moved into alignment with the infeed set of ends of a selected set of racks in the kiln by selective operation of motor 48. The pusher mechanism is placed substantially in axial alignment with a selected rack in the set by operation of motor 222. Concurrently the outfeed mechanism is aligned with the outfeed end of the same rack.

Block-laden pallets are moved in succession to the infeed mechanism by infeed conveyor 28, with the pallets spaced apart on the conveyor. As each successive pallet is moved into position over jump roller mechanism 70, it is lifted from the chain conveyor, shifted onto rollers 90, and is carried on rollers 90 into a position under elevator 100. Movement of successive pallets onto rollers 90 forms them into a row in end-to-end abutting relationship with the row substantially paralleling the axis of the racks.

As the block-laden pallets are formed into a row on rollers 90 elevator 100 is lowered by contraction of ram 180 with its lifting arms swung to their open position, as illustrated in dot-dashed outline in FIG. 4. The elevator is lowered to a position in which the arms are spaced to opposite sides of opposite marginal edges of the pallets in the row.

When a preselected number of pallets have been formed into a row on rollers 90, appropriate control mechanism is actuated to extend ram 146 causing the lift arms of the elevator to swing toward each other to their closed position, to grip opposed edge margins of pallets in the row, as illustrated in FIGS. 4 and 10.

Ram 180 then is extended to lift elevator 100 and the pallets supported thereby to a position adjacent pusher 200. As the elevator is being raised, the subframe on which the lifting arms are mounted and the bar 154 on which switch 158 is mounted are in what may be considered retracted positions, spaced outwardly from the infeed ends of the racks as shown in solid outline in FIG. 3. In these retracted positions, they may pass freely by the infeed ends of the racks and actuator angles 164 as the elevator is raised.

As the elevator nears the elevation of pusher mechanism 200, cam plate 242 is engaged by trip arm 250 which operates a rotary valve to slow operation or ram 180, and thus slow raising of the elevator. Cam follower 160 of bar 154 also engages cam 240 and continued raising of the elevator produces shifting of bar 156 and switch 158 horizontally toward the infeed ends of the racks whereby switch arm 158a is in a position to engage an actuating angle 164. When the elevator is raised to a position wherein switch 158 is actuated by an angle 164, supply of pressure fluid to ram 180 is halted stopping elevator 100.

When the elevator is stopped, lifting arms 128 are axially aligned with a rack in the kiln. Ram 150 on the elevator then is extended to shift the lifting arms toward the racks and into interlocking engagement therewith, as shown in FIG. 2 and the dot-dash portion of FIG. 9. In such position, the pallet-carrying channels of the lift arms join with the channels in the rack channels to define a substantially continuous path for movement of the pallets from the lift arms onto the racks.

When the lifting arms are properly locked into position with the channels of the selected rack, ram 206 is extended causing pusher head 208 to engage and push against the rearmost pallet in the row held on the elevator. Continued pushing by the pusher head slides the block-laden pallets from the lifting arms onto the racks with which they are aligned. Since the upper and lower marginal edge portions of the pallets are confined by support pads 134 and guide bars 136 on the lifting arms and by flanges 14a, 14b on the rack channel contiguous ends of adjacent pallets are prevented from riding up and onto each other during the pushing operation.

At the same time that the elevator at the infeed end is being placed in alignment with the selected rack, the elevator at the outfeed end of the mechanism is also being placed in interlocking relationship with the outfeed end of the same rack, as seen in FIG. 2. Thus, when a rack is full and additional pallets are pushed thereon, a corresponding number of block-laden pallets are forced off of the outfeed end of the rack and onto the lifting arms of the transfer mechanism at the outfeed end of the racks.

Since the lifting arms on the elevators at both the infeed and outfeed ends of the racks, and the racks themselves have guides confining upper and lower marginal edge portions of the block-laden pallets, a plurality of pallets may pushed from the infeed elevators and onto the racks without fear of adjacent edges of abutting pallets riding up and over each other.

Once the block-laden pallets have been discharged from the lifting arms of the infeed elevator, ram 150 retracts to move the lifting arms out of engagement with the selected rack, and lowering of the elevator begins. As the elevator lowers, the spring bias on bar 154 moves the bar and its associated switch 158 to the retracted position shown in solid outline in FIG. 3. The elevator then may be lowered to pick up another row of block-laden pallets which have been formed on rollers 90 during the lifting and discharge operation previously described.

Concurrently with lowering of elevator 100, elevator 266 at the outfeed end of the racks is lowered to place pallets discharged from the rack onto chain conveyor 280.

After a selected number of pallets have been placed on a rack, the infeed and outfeed mechanisms may be moved to another rack in the same stack of racks or to a rack in a stack spaced laterally thereof to load pallets as desired.

With such apparatus, a plurality of block-laden pallets may be formed into a row, lifted to the selected rack onto which they are to be loaded, and may be pushed therefrom without fear of one pallet riding up and over the other pallet since a substantially continuous guide channel is provided on the lifting arms, kiln racks, and lowering arms of the outfeed elevator. By providing such mechanism, great efficiencies in operation and fast loading and unloading are possible.

While a specific embodiment of the invention has been described herein, it should be appreciated that variations and modifications are possible without departing from the spirit of the invention.

It is claimed and desired to secure by letters patent:

1. Apparatus for loading articles onto a selected one of a set of elongate, vertically stacked racks adapted to receive such articles at an infeed set of their ends wherein each rack has upper and lower guides defining a channel therebetween for receiving and confining upper and lower marginal edge portions of a plurality of articles received thereon disposed in end-to-end relationship in a row, said apparatus comprising an elongate infeed conveyor disposed below and adjacent the infeed ends of the racks operable to carry articles substantially horizontally and in succession toward the infeed ends of the racks, a vertically movable pusher spaced outwardly from the infeed ends of the racks adjustable selectively to at least two vertically spaced positions, each generally in axial alignment with a different one of said racks, said pusher including a pusher head shiftable under power toward and away from the infeed end of a rack with which it is aligned, an elevator positioned between the infeed ends of the racks and the pusher and adjacent the conveyor, said elevator including opposed, laterally spaced lifting arms adapted to receive and hold a plurality of articles carried thereto by said conveyor with the articles held on the arms in a row in end-to-end relationship, each arm having upper and lower guide means thereon defining a channel therebetween for slidably receiving and confining upper and lower marginal edge portions of articles held on the arms, lift means operable to shift said lifting arms vertically between a lowered position adjacent said conveyor for receiving articles therefrom and selected raised positions wherein the channels defined by the guide means of the lifting arms are substantially in axial alignment with the channels defined by the guides of a rack with which the pusher is aligned, and means mounting said lifting arms for shifting substantially horizontally toward and away from the infeed ends of said racks, and means for shifting said lifting arms substantially horizontally between a first position spaced horizontally outwardly from the infeed ends of the racks and a second position contiguous the infeed end of a selected rack with the guide channels of said lifting arms and rack joined to define a substantially continuous guide path for articles which may be pushed from the elevator onto the rack by operation of said pusher.

2. The apparatus of claim 1, which further comprises operating means operable to sense when the lifting arms of the elevator have been raised to a position substantially in axial alignment with a selected rack and when the lifting arms are in such position is operable to actuate the shifting means to move the lifting arms into their second position contiguous the ends of the racks.

3. The apparatus of claim 1, which further comprises a pair of mating aligning members, one of which is secured to the infeed end of a rack and the other of which is secured to the end of a lifting arm nearest said racks, said aligning means being positioned to engage one another when the lifting arm is shifted into position contiguous a rack to assure alignment of the channels in the lifting arms and rack.

4. The apparatus of claim 1, wherein said lifting arms are mounted on said elevator for lateral movement toward and away from each other between an open position spaced from each other a distance greater than the side-to-side dimension of an article to be lifted permitting movement of articles therebetween, and a closed position spaced more closely together to support opposed side marginal edge portions of a plurality of articles interposed therebetween.

5. The apparatus of claim 2, wherein said operating means comprises sensing means mounted on said elevator for vertical movement therewith and for shifting horizontally toward and away from said racks independently of said lifting arms, a plurality of actuating means mounted adjacent said infeed ends of the racks with one of said actuating means associated with each of said racks, and means for shifting said sensing means horizontally between a first position spaced outwardly from the infeed ends of the racks in which position it may be moved vertically past said actuating means without actuation of the sensing means occurring and a second position disposed for actuation by an actuating means.

6. The apparatus of claim 5, wherein said means for shifting said sensing means horizontally comprises a cam mounted on said pusher and a cam follower on said elevator operatively connected to said sensing means operable to engage said cam on vertical shifting of the elevator and to produce shifting of the sensing means between its first and second positions in direct relation to its vertical position relative to said pusher.

7. The apparatus of claim 5, wherein said sensing means comprises a switch having an actuating arm projecting outwardly therefrom generally in the direction of the infeed ends of the racks and an actuating means comprises a member secured adjacent a rack and projecting outwardly toward said elevator in a position to be engaged by said actuating arm when said sensing means is in its second position.

8. The apparatus of claim 1, wherein said conveyor comprises means for aligning a plurality of articles in end-to-end relation in a row extending substantially parallel to the longitudinal axis of a rack, and said lifting arms of the elevator are mounted for lateral movement toward and away from each other between an open position spaced from each other a distance greater than the side-to-side dimension of an article to be lifted to permit articles to be aligned in a row therebetween by said conveyor and a closed position spaced closer together to engage opposed marginal edge portions of the articles in such row.

9. The apparatus of claim 8, wherein said lower guide means of a lifting arm is adapted to provide underlying support for marginal edge portions of articles and said upper guide means is spaced above said lower guide means a distance which is greater than the height of the edge margin of an article to be lifted by the lifting arms, but is less than twice such height.

10. The apparatus of claim 1, wherein said upper and lower guide means are spaced apart vertically a distance which is greater than the height of an edge margin of an article to be lifted by the lifting arms but is less than twice such height.

11. The apparatus of claim 1, wherein the pusher comprises an extensible-contractible ram disposed with its longitudinal axis extending substantially parallel to the racks, said lifting arms of the elevator extend between said ram and the infeed ends of said racks, and the ram is operable, on being extended to shove articles off said arms and onto a rack, with said upper and lower guide means confining upper and lower marginal edges of articles on the lifting arms being positioned to prevent contiguous ends of articles in the row from riding up and over each other during such pushing.

12. The apparatus of claim 1, wherein there is another set of elongate vertically stacked racks disposed laterally adjacent said first-mentioned set, with each rack in said other set at substantially the same elevation as a rack in the first-mentioned set, said pusher and elevator are mounted for movement laterally of the ends of such racks, and which further comprises power-operated means operatively connected to said pusher and elevator operable to move the same laterally of said ends of the racks from positions adjacent the ends of the racks in one set to positions adjacent the ends of the racks in the other set.

13. The apparatus of claim 1, wherein said racks have an outfeed set of ends from which articles may be discharged and which further comprises an outfeed conveyor spaced vertically from said racks operable to move articles substantially horizontally and in succession away from said outfeed ends, and transfer means disposed intermediate said outfeed ends and the outfeed conveyor, said transfer means including means operable to receive articles discharged from the racks and to shift them vertically onto said outfeed conveyor.

14. The apparatus of claim 13, wherein said transfer means comprises a vertically movable article receiver mounted for selective adjustment to different vertically spaced positions, each generally in alignment with the outfeed end of a different one of said racks, motor means connected to said receiver for moving the same between said different positions, and control means connecting said adjustment means for said pusher and the motor means for said receiver operable to produce adjustment of said receiver, whereby it is maintained adjacent the outfeed end of the same rack with which the shifter is aligned.

15. The apparatus of claim 1, wherein there is another set of elongate, vertically stacked racks disposed adjacent and laterally of said first-mentioned set, and which further comprises a substantially upright traveling frame mounted for movement laterally of the infeed ends of the racks in said sets, and said pusher is mounted on a vertically shiftable carriage carried on said traveling frame.

16. Apparatus for loading articles onto a selected one of a set of elongate, vertically stacked racks adapted to receive such articles at an infeed set of their ends wherein the racks have upper and lower guides defining a channel therebetween for slidably receiving articles therein and confining upper and lower marginal edge portions of such articles, said apparatus comprising an elongate infeed conveyor disposed below and adjacent the infeed ends of the racks operable to carry articles substantially horizontally and in succession toward the infeed ends of the racks, an elevator adjacent the infeed ends of the racks including opposed, laterally spaced, elongate, substantially horizontal lifting arms adapted to receive and hold a plurality of articles carried thereto by said conveyor with the articles held on the arms in end-to-end relationship, each arm having upper and lower guide means defining a channel extending longitudinally thereof for slidably receiving opposed edge margins of such articles and confining upper and lower marginal edge portions of such articles, lift means for moving said arms upwardly from a receiving position adjacent said conveyor to a position wherein articles carried by said arms are substantially in axial alignment with one of said racks, and means mounting said arms for horizontal shifting toward and away from said racks between a first position spaced a distance outwardly therefrom and a second position in which one end of a lifting arm engages the infeed end of a rack with the channels of said rack and arm joined to form a substantially continuous guide path for articles to be moved from said lifting arm onto a rack, and a vertically movable pusher mounted adjacent said elevator, adjustable selectively to at least two different vertically spaced positions, each generally in axial alignment with a different one of said racks, said pusher being operable when in a position aligned with a selected rack and with a plurality of articles held on said elevator in alignment with said selected rack, to shift the articles laterally from the elevator and onto the adjacent infeed end of the rack.

* * * * *